(12) United States Patent
Hiraiwa

(10) Patent No.: US 9,703,999 B2
(45) Date of Patent: Jul. 11, 2017

(54) CARD READER

(71) Applicant: DENSO WAVE INCORPORATED, Chita-gun, Aichi-pref. (JP)

(72) Inventor: Yosuke Hiraiwa, Anjo (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/797,486

(22) Filed: Jul. 13, 2015

(65) Prior Publication Data

US 2016/0042210 A1  Feb. 11, 2016

(30) Foreign Application Priority Data

Aug. 8, 2014  (JP) ................. 2014-162692

(51) Int. Cl.
*G06K 7/10* (2006.01)
(52) U.S. Cl.
CPC ................ *G06K 7/10356* (2013.01)
(58) Field of Classification Search
CPC ........... G06K 7/10356; G06K 19/0723; G06K 19/07749; G06K 7/0008
See application file for complete search history.

(56) References Cited

U.S. PATENT DOCUMENTS

| | | |
|---|---|---|
| 6,285,295 B1 | 9/2001 | Casden |
| 6,828,902 B2 | 12/2004 | Casden |
| 2004/0037026 A1 | 2/2004 | Mori |
| 2005/0077357 A1 | 4/2005 | Roux |
| 2008/0007408 A1 | 1/2008 | Hwang et al. |
| 2008/0149735 A1 | 6/2008 | Kozlay |
| 2009/0061768 A1 | 3/2009 | Simada |
| 2011/0198398 A1* | 8/2011 | Itay .................... G06K 7/10356 235/439 |
| 2011/0241837 A1 | 10/2011 | Suzuki |

(Continued)

FOREIGN PATENT DOCUMENTS

| | | |
|---|---|---|
| JP | 2003-006578 A | 1/2003 |
| JP | 2005-115446 A | 4/2005 |
| JP | 2008-059190 A | 3/2008 |

OTHER PUBLICATIONS

U.S. Appl. No. 14/797,590, filed Jul. 13, 2015 in the name of Hiraiwa.

(Continued)

*Primary Examiner* — Sonji Johnson
(74) *Attorney, Agent, or Firm* — Oliff PLC

(57) ABSTRACT

A card reader to read information in an integrated circuit (IC) card includes a housing, a first antenna, a control circuit, a switch unit, and a third antenna. The first antenna is disposed inside of the housing. The control circuit is to communicate with the IC card within a communication range of the first antenna and perform at least a process that acquires data from a memory in the IC card. The switch unit is provided to the housing and includes a radio frequency (RF) tag that includes a second antenna. The third antenna is disposed inside of the housing. The switch unit functions as a switch that performs a predetermined function by causing the RF tag to communicate with the control circuit via the second antenna and the third antenna when a predetermined condition is satisfied.

3 Claims, 7 Drawing Sheets

(56) References Cited

U.S. PATENT DOCUMENTS

2014/0145823 A1    5/2014  Aase
2015/0061836 A1*   3/2015  Eikman .............. G06K 19/0716
                                                            340/10.3

OTHER PUBLICATIONS

U.S. Appl. No. 14/797,581, filed Jul. 13, 2015 in the name of Hiraiwa.
Jan. 13, 2016 Office Action issued in U.S. Appl. No. 14/797,581.

* cited by examiner

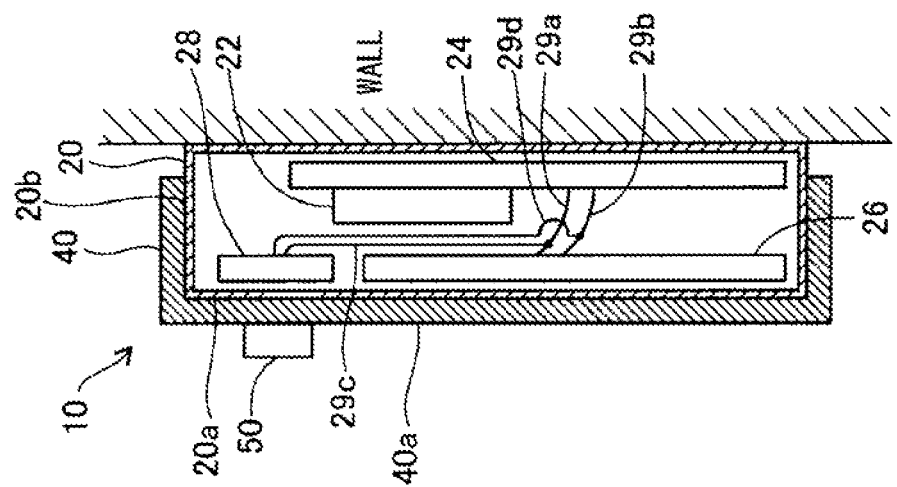
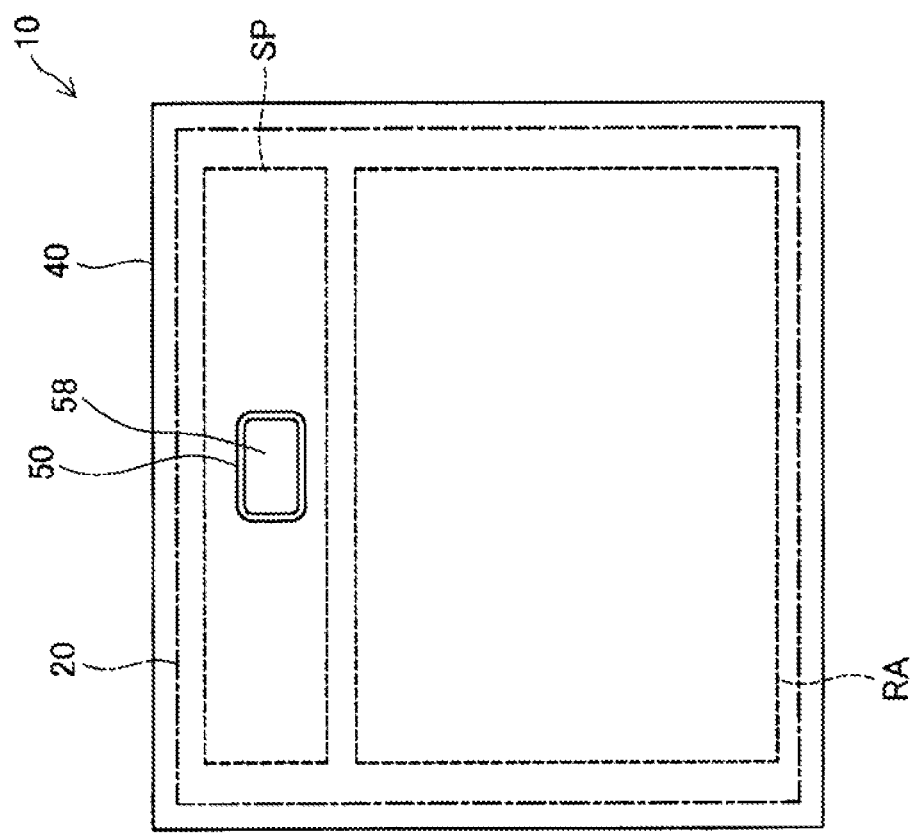

COMPARATIVE

CARD READER

CROSS REFERENCE TO RELATED APPLICATION

The present application is based on Japanese Patent Application No. 2014-162692 filed on Aug. 8, 2014, the disclosure of which is incorporated herein by reference.

TECHNICAL FIELD

The present disclosure relates to a card reader that reads the information in an integrated circuit (IC) card.

BACKGROUND ART

Patent Literature 1: JP 2003-006578 A

Access control systems are conventionally known to use contactless IC cards for access controls of entering and exiting facilitates, such as offices, warehouses, hospitals (for example, see Patent Literature 1). Such access control systems require each user to only bring his/her contactless IC card in proximity of the card reader installed adjacent to a door of a room to activate wireless communication to immediately identify the user, thereby unlocking the electric lock to permit the user to enter the room.

Some access control systems are further known to install a press-button switch unit on the front face of the card reader. The switch unit is intended to add a function to the card reader, such as a switch for designating a security control associated with security instruments. Each user presses the press-button switch unit and brings the contactless IC card close to the card reader, activating the security control.

Such conventional card readers in some cases respond to the needs of each customer for the usability, such as changing positions of press-button switch units, adding new press-button switch units, thereby involving custom-made design changes. The design changes typically include changes of housing or internal wiring for installing switch units, unfortunately leading to difficulties in re-designing the intensity, waterproofness, and reading performance including reading distance and communication success ratio, against the housing of the reader.

SUMMARY

It is an object of the present disclosure to provide a card reader to solve such difficulties.

An example of the present disclosure provides a card reader that reads information in an integrated circuit (IC) card as follows. The card reader includes a housing, a first antenna, a control circuit, a switch unit, and a third antenna. The first antenna is disposed inside of the housing. The control circuit is to communicate with the IC card within a communication range of the first antenna and perform at least a process that acquires data from a memory in the IC card. The switch unit is provided to the housing and includes a radio frequency (RF) tag that includes a second antenna. The third antenna is disposed inside of the housing. The switch unit functions as a switch that performs a predetermined function by causing the RF tag to communicate with the control circuit via the second antenna and the third antenna when a predetermined condition is satisfied.

According to the card reader of this example, attaching of the switch unit to the housing and providing of the third antenna inside of the housing allow the reliable wireless communication between the switch unit and the control circuit by using the RF tag. Attaching the switch unit to the housing thus eliminates the needs of changes in the internal wiring or changes in the housing structure, such as boring a hole in the housing for wiring. This facilitates the design changes such as change of the attachment position of the switch unit and adding a new switch unit. In addition, according to the card reader of this example, the third antenna is used for communicating with the second antenna of the switch unit, allowing the second antenna to be arranged adjacent to the third antenna. This enables to reduce the size, such as an area or the number of turns, of the third antenna and facilitate the re-arrangement of the third antenna when needed in moving or adding a switch unit. Further, the third antenna having a compact size allows easy design change when the card reader is prepared by changing the design of a conventional card reader that connects a press-button switch unit to a control circuit with wiring.

BRIEF DESCRIPTION OF THE DRAWINGS

The above and other objects, features, and advantages of the present disclosure will become more apparent from the following detailed description made with reference to the accompanying drawings. In the drawings:

FIG. 1A is a front view of a card reader according to a first embodiment of the present disclosure;

FIG. 1B is a partial cross-sectional side view of the card reader;

FIG. 4 is a diagram for explaining a principle of the communication between an RF tag and an IC chip with an antenna coil turned on;

DETAILED DESCRIPTION

Figure 2:
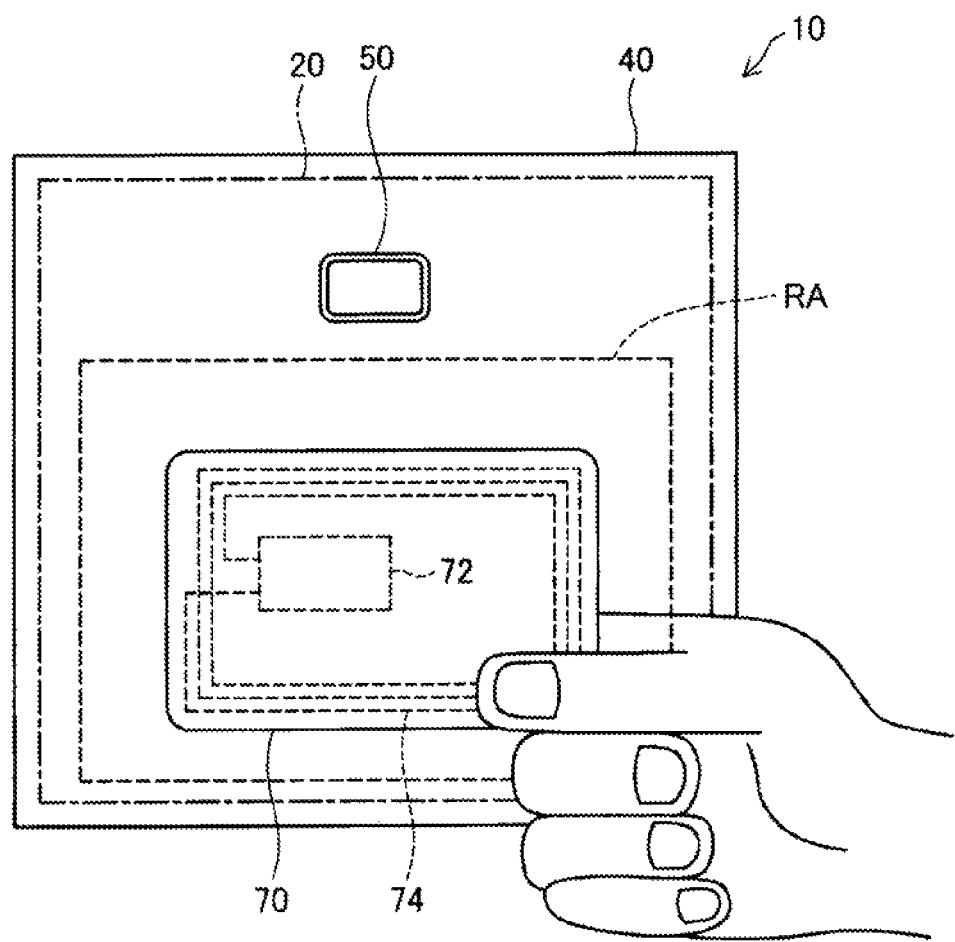
FIG. 2 is a front view of the card reader with an ID card held in contact with a main body of the card reader.

The following will explain embodiments of the present disclosure.

A. First Embodiment

A-1. Configuration

A card reader 10 according to a first embodiment of the present disclosure is illustrated in FIGS. 1A and 1B. FIG. 1A illustrates a front view; FIG. 1B illustrates a partial cross-sectional side view. The card reader 10 is an apparatus for reading information in an identification (ID) card that is unshown. The present embodiment provides the card reader 10 that is included in an access control system managing access controls for entering and exiting offices, for instance. The ID card is a contactless integrated circuit (IC) card, which may be also referred to a non-contact IC card, for personal identification or personal authentication; the ID card is required to be held by office employees in offices, for instance.

As in FIGS. 1A and 1B, the card reader 10 includes a main body 20, a cover 40, and a press-button switch unit 50.

The main body 20 is shaped of a box having a front plate part 20a, a side plate part 20b, and a back plate part 20c. The main body 20 is attached adjacent to a door for entering and exiting an office with the back plate part 20c contacting a wall of the office. The main body 20 contains internally (i) a circuit board 24 mounting with an integrated circuit (IC) chip 22, (ii) a main loop antenna 26 (or antenna coil) connected to the circuit board 24, and (iii) an auxiliary loop antenna 28 (or antenna coil) connected to the circuit board 24.

The main loop antenna 26 is to communicate with the ID card and is arranged as facing the front plate part 20a of the main body 20. The auxiliary loop antenna 28 is to communicate with the press-button switch unit 50 and is arranged also as facing the front plate part 20a of the main body 20. This "facing each other" signifies an arrangement permitting (i) the loop plane of each loop antenna and (ii) the front plate part 20a to face each other in parallel or in substantially parallel. Such an arrangement may be alternatively defined as facing each other by forming an angle between the loop plane and the front plate part 20a to be within a range from 135 to 225 degrees. The press-button switch unit 50 has a communication function to be explained in detail later.

The main loop antenna 26 has a size greater than that of the auxiliary loop antenna 28. The main loop antenna 26 is arranged in a lower side in the vertical direction along the front plate part 20a, whereas the auxiliary loop antenna 28 is arranged in an upper side in the vertical direction along the front plate part 20a; the main loop antenna 26 is separate from the auxiliary loop antenna 28 with a gap. The main loop antenna 26 is connected to the circuit board 24 with the cables 29a and 29b. The cables 29a and 29b are connected with cables 29c and 29d; the respective ends of the cables 29c and 29d are connected to the auxiliary loop antenna 28. The auxiliary loop antenna 28 is thus connected in parallel to the main loop antenna 26.

The IC chip 22 includes a memory that stores data, a CPU (Central Processing Unit), and an RF (Radio Frequency) unit (also referred to as a wireless unit), which modulates and demodulates data, for instance. The main loop antenna 26 and the auxiliary loop antenna 28 are connected to the RF unit via the circuit board 24 and the cables 29a to 29d.

The cover 40 is attached to the main body 20 so as to cover, of the main body 20, the front plate part 20a and part of the side plate part 20b. The cover 40 has a front face 40a where a reading area RA (see FIG. 1B) for the ID card is formed. This reading area RA is an area corresponding to a communication range of the main loop antenna 26. Note that the reading area RA is illustrated only just for explanation; the reading area RA may not be square in practice and may not specify a border between a readable area and a non-readable area certainly. The main loop antenna 26 is arranged on a lower side from the auxiliary loop antenna 28 in the main body 20, providing a space SP (empty area) over the reading area RA in the front face 40a of the cover 40 (see FIGS. 1A and 1B). The space SP is an area corresponding to a communication range of the auxiliary loop antenna 28. Note that the space SP may not specify or define clearly the communication range of the auxiliary loop antenna 28, either.

The reading area RA serving as the communication range of the main loop antenna 26, and the space SP serving as the communication range of the auxiliary loop antenna 28, which may not need to be limited to have the above positions or sizes, may have any positions or sizes as long as they each contain at least part of the front face 40a of the cover 40.

A-2. Configuration of ID Card

FIG. 2 is a front view of the card reader 10 with the ID card 70 held in contact with the main body 20 of the card reader 10. The ID card 70 held by a user when entering or exiting a room is caused to be in contact with or close to the reading area RA of the card reader 10. The contactless IC card serving as the ID card 70 contains internally an IC chip 72 and an antenna coil 74 connected to the IC chip 72. The card reader 10 communicates with the ID card 70 having entered the communication range of the main loop antenna 26 via the main loop antenna 26 and the antenna coil 74, reading the data from a memory in the IC chip 72 of the ID card 70. The present embodiment, which provides the above reading of the data from the ID card 70, may alternatively provide writing of data into a memory in the IC chip 72 of the ID card 70.

The read data corresponds to an authentication data that authenticates an individual in the present embodiment. The access control system causes the card reader 10 to determine whether the authentication data read from the ID card 70 corresponds to or accords with the data for authentication comparison that is registered previously. When according, the door for entering and exiting the office or room is unlocked.

A-3. Configuration of Press-Button Switch Unit

Returning to FIGS. 1A and 1B, the card reader 10 includes the press-button switch unit 50 as mentioned above. The press-button switch unit 50 is attached to the space SP in the front face 40a of the cover 40 using double-stick tapes. The space SP corresponding to the communication range of the auxiliary loop antenna 28; the auxiliary loop antenna 28 thus functions as an antenna for the press-button switch unit 50. Instead of using double-stick tapes, the press-button switch unit 50 may be attached using other means, such as adhesives or fastening bolts. The press-button switch unit 50 is to designate "security" (i.e., security control) associated with security instruments in the present embodiment.

The present embodiment may define a casing portion as including the front plate part 20a, the side plate part 20b, and the back plate part 20c of the main body 20; the casing portion together with the cover 40 may be referred to as a housing. That is, any member added or attached to the casing portion of the main body 20 may be defined as being included in the housing. The present embodiment, which provides the above configuration including the cover 40, may alternatively provide another configuration eliminating the cover 40; namely, the press-button switch unit 50 may be attached directly to the front plate part 20a of the main body 20.

Figure 3:
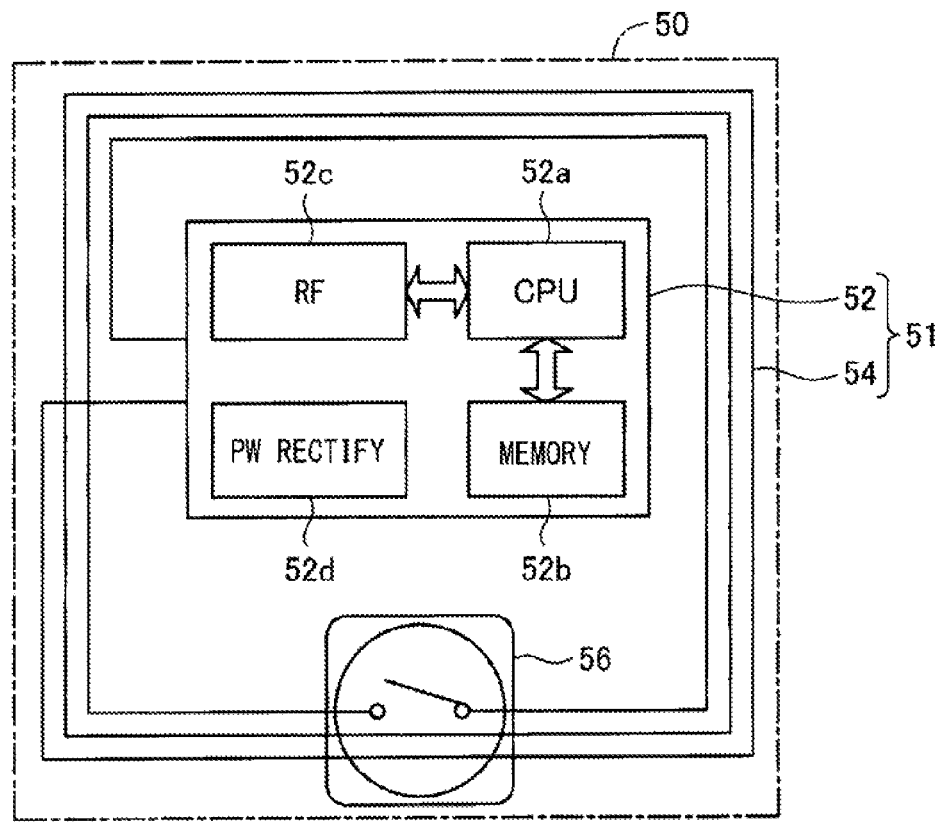
FIG. 3 is a diagram for explaining an internal configuration of a press-button switch unit.

FIG. 3 is a diagram for explaining an internal configuration of the press-button switch unit 50, which contains internally an IC chip 52, an antenna coil 54, and a switch body 56.

The antenna coil 54 is shaped of a planar loop with winding in a coil form in plane, and is connected with the IC chip 52. The antenna coil 54 is also replaceable with any other antennas shaped of various forms, such as rod, patch, slot, swirl, pattern.

The IC chip 52 includes a CPU 52a, a memory 52b, an RF (Radio Frequency) unit 52c, and a power rectification unit 52d. The RF unit 52c, which may be also referred to as a wireless unit, includes a reception portion that demodulates, and a transmission portion that modulates. The power rectification unit 52d rectifies the electric power generated with the electromagnetic induction. The CPU 52a performs processes including a process controlling demodulating and modulation and a process reading tag information from the memory 52b. The memory 52b stores previously the tag information, which includes an identification data identifying an individual, a tag-type data indicating a press-button switch.

The IC chip 52 and the antenna coil 54 constitute an RF (Radio Frequency) tag 51.

The switch body 56, which is incorporated in the middle of the antenna coil 54, responds to a press manipulation by the user to a manipulation portion 58 that is shaped of a button (see FIG. 1A) included in the press-button switch unit 50, turning the antenna coil 54 into ON state (with the circuit closed) and turning it into OFF state (with the circuit opened). The switch body 56, which uses a membrane switch in the present embodiment, may alternatively use a reed switch, a microswitch, a piezo-electric switch, or a conductive rubber switch other than the membrane switch. In the push-button switch unit 50, the antenna coil 54 is maintained in OFF state in the initial state and is moved into ON state in response to a press manipulation. Alternatively, the antenna coil 54 may be maintained in ON state in the initial state and is moved into OFF state in response to a press manipulation. The switch body 56, which is incorporated in the middle of the antenna coil 54, may be alternatively incorporated into the IC chip 52 to turn on and off transmissions and receptions of the antenna coil 54.

Figure 4:
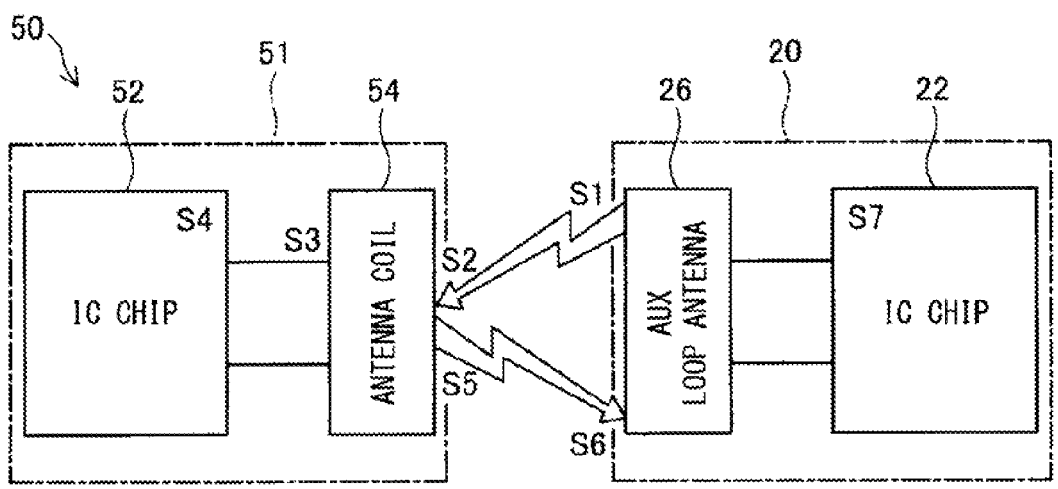

FIG. 4 is a diagram for explaining a principle of the communication between the RF tag 51 and the IC chip 22 of the main body 20 with the antenna coil 54 turned on. Note that the present embodiment provides the RF tag 51 being a passive tag that operates on energy source that derives from signals transmitted from the card reader 10. At S1, the IC chip 22 in the main body 20 transmits signals on magnetic field via the auxiliary loop antenna 28. At S2, the RF tag 51 of the press-button switch unit 50 subsequently receives the magnetic field from the auxiliary loop antenna 28 via the antenna coil 54. At S3, the antenna coil 54 of the RF tag 51 comes to be in resonance state at the operating frequency (also referred to as a clock frequency) of the auxiliary loop antenna 28, generating electric power in the antenna coil 54 itself. At S4, the IC chip 52 of the RF tag 51 then operates or activates the CPU 52a and the memory 52b of the IC chip 52 (see FIG. 3) using the generated electric power to execute necessary processes.

At S5, the IC chip 52 puts the data held by the RF tag 51 on the magnetic field to return the data from the antenna coil 54. At S6, the auxiliary loop antenna 28 in the main body 20 receives the magnetic field from the RF tag 51. At S7, the IC chip 22 in the main body 20 takes out the data from the magnetic field. As explained above, as the antenna coil 54 is turned into ON state, the communication takes place between (i) the RF tag 51 in the press-button switch unit 50 and (ii) the IC chip 22 in the main body 20, permitting data transmissions and data receptions between the RF tag 51 and the IC chip 22 in the main body 20. Note that the present embodiment uses the electromagnetic induction for communicating data or information, but may alternatively use the radio wave or electric waves.

As explained above, although the auxiliary loop antenna 28 has the size smaller than that of the main loop antenna 26, the auxiliary loop antenna 28 and the RF tag 51 are arranged always adjacent to each other unlike the case of reading the ID card; this maintains the communication sensitivity. That is, arranging the auxiliary loop antenna 28 and RF tag 51 to be in proximity to each other allows the auxiliary loop antenna 28 for the press-button switch unit 50 to have a size smaller than that of the main loop antenna 26 for the ID card 70.

In the present embodiment, the main loop antenna 26 included in the main body 20 may be also referred to as a first antenna; the IC chip 22 may be also referred to as a control circuit; the press-button switch unit 50 may be also referred to as a switch unit; the antenna coil 54 included in the press-button switch unit 50 may be referred to as a second antenna; and the auxiliary loop antenna 28 included in the main body 20 may be also referred to as a third antenna.

A-4. Tag Information Reading Process

Figure 5:
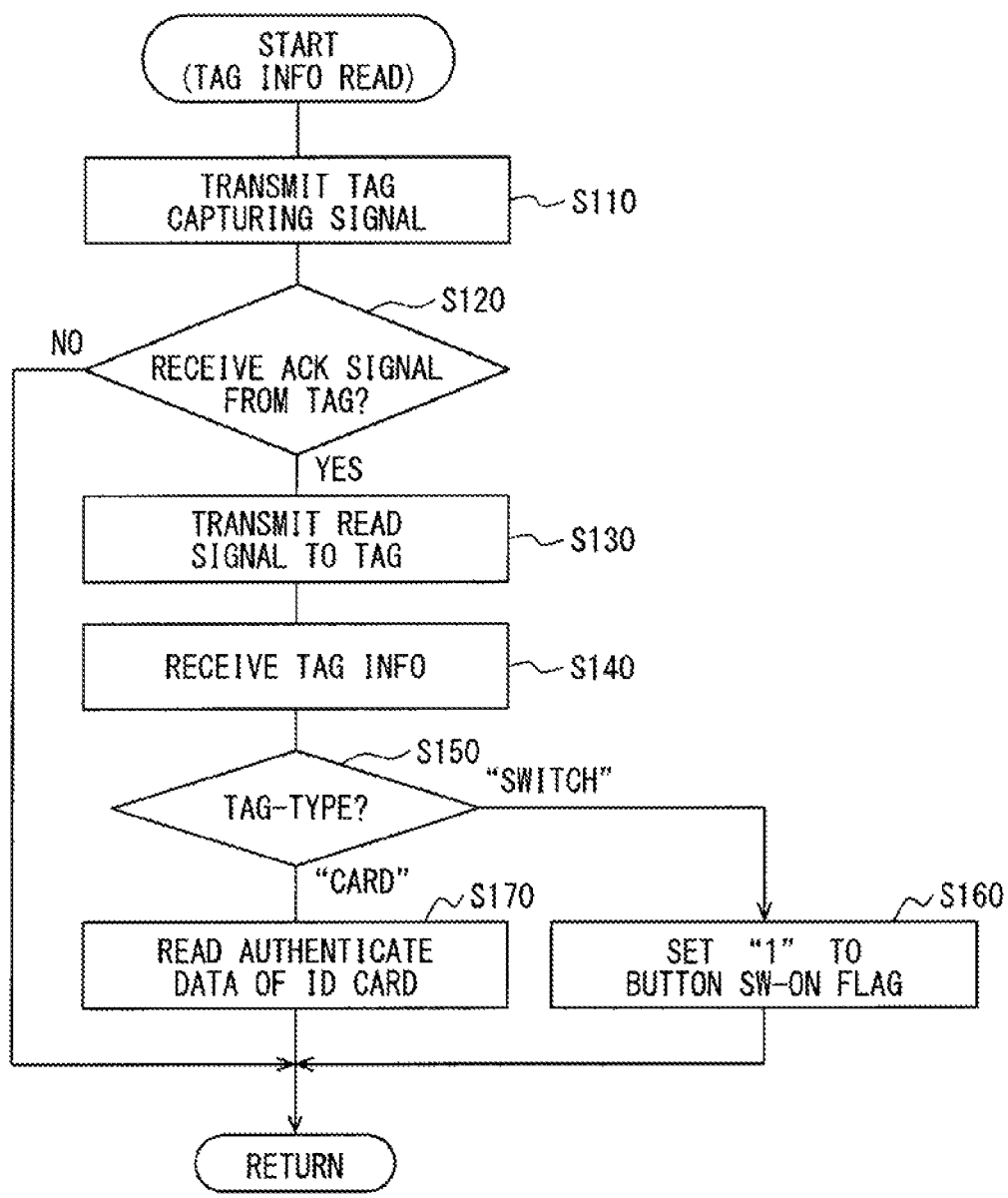
FIG. 5 is a flowchart diagram illustrating a tag information reading process executed by an IC chip in the main body of the card reader.

FIG. 5 is a flowchart diagram illustrating a tag information reading process executed by the IC chip 22 in the main body 20 of the card reader 10. This tag information reading process is repeatedly executed by a CPU included in the IC chip 22 with predetermined time intervals. As starting the process, the CPU transmits a tag capturing signal via the main loop antenna 26 and the auxiliary loop antenna 28 in the main body 20 at S110 (S may indicate a section or step). The tag capturing signal is a signal for capturing or recognizing any RF tag entering the communication ranges of the main loop antenna 26 and the auxiliary loop antenna 28, and continues to be transmitted regardless of whether any RF tag is present within each communication range. This RF tag signifies each of general RF tags that include at least (i) the RF tag 51 included in the press-button switch unit 50 and (ii) the contactless IC card serving as the ID card 70 as well. At S110, tag capturing signals are transmitted to determine whether the ID card 70 or the RF tag 51 of the press-button switch unit 50 is present within the communication ranges of the main loop antenna 26 and the auxiliary loop antenna 28.

When a press manipulation is applied to the manipulation portion 58 (see FIGS. 1A and 1B) of the press-button switch unit 50, the antenna coil 54 of the press-button switch unit 50 is turned into an ON state. This comes to detect that the RF tag 51 of the press-button switch unit 50 is present within the communication range of the auxiliary loop antenna 28 (see FIGS. 1A and 1B). The communication between the RF tag 51 and the IC chip 22 of the main body 20 thus takes place according to the above-mentioned principle in FIG. 4, permitting the RF tag 51 to return acknowledge signal indicating a reception of the RF capturing signal to the IC chip 22 of the main body 20 via the antenna coil 54 and the auxiliary loop antenna 28. In contrast, when any press manipulation is not applied to the manipulation portion 58 of the press-button switch unit 50, the antenna coil 54 remains in a non-conductive state to fail to receive the radio waves transmitted from the auxiliary loop antenna 28. The RF tag 51 thus returns none of acknowledge signals to the IC chip 22.

In addition, when the ID card 70 is in contact with or in proximity to the reading area RA and thus is present within the communication range of the main loop antenna 26, the communication between the ID card 70 and the IC chip 22 in the main body 20 takes place, according to the same principle as in FIG. 4. This communication permits the IC chip 72 of the ID card 70 to return an acknowledge signal to the IC chip 22 of the main body 20 via the antenna coil 74 and the main loop antenna 26.

Returning to FIG. 5, at S120, the CPU of the IC chip 22 determines whether to receive an acknowledge signal ACK signal) from the RF tag 51 of the press-button switch unit 50 or the ID card 70. When determining not receiving any acknowledge signal, the processing proceeds directly to "RETURN," terminating once the tag information reading process.

In contrast, when determining receiving an acknowledge signal at S120, the CPU transmits, at S130, an information read signal to an RF tag, i.e., whichever of the RF tag 51 of the press-button switch unit 50 or the ID card 70 has transmitted the acknowledge signal. Suppose that plural acknowledge signals are determined to be received from plural tags, i.e., from both the ID card 70 and the RF tag 51 of the press-button switch unit 50. In such cases, the RF tag whose acknowledge signal is received earlier than the other is regarded as "the RF tag whose acknowledge signal is received." Alternatively, "the RF tag whose acknowledge signal is received" may be predetermined to be one of them; for instance, the RF tag 51 of the press-button switch unit 50 may be regarded as "the RF tag whose acknowledge signal is received" if acknowledge signals are received from both the RF tag 51 and the ID card 70.

At S140, the CPU performs the process that receives the data serving as the tag information from the RF tag whose acknowledge signal is received. In specific, when the RF tag whose acknowledge signal is received corresponds to the RF tag 51 of the press-button switch unit 50, the CPU of the IC chip 22 receives the identification data and the tag-type data as the tag identification information from the memory 52b of the IC chip 52. In contrast, when the RF tag whose acknowledge signal is received corresponds to the ID card 70, the CPU receives the identification data and the tag-type data from the memory of the IC chip 72.

At S150, the CPU determines whether the tag-type data received at S140 corresponds to the press-button switch unit 50 or the ID card. When determining that the tag-type data corresponds to the press-button switch unit 50, the CPU sets the value of one "1" to the button SW-ON flag that is prepared previously, at S160. The button switch-ON flag, which indicates that the press-button switch unit 50 is turned on, is stored in the memory 52b of the IC chip 52. Note that, at S160, the CPU may further make a determination as to whether the identification data received at S140 accords with a registration data that is registered previously and then sets the value of one "1" to the button SW-ON flag if the determination is affirmed. This can prevent an inappropriate action or injustice, which would replace the press-button switch unit 50 with another button switch.

In contrast, when the tag-type data is determined to correspond to the ID card 70 at S150, the CPU executes a subsequent process which reads the authentication data stored in the ID card 70 at S170. After S160 or S170, the CPU proceeds to "RETURN," terminating once the tag information reading process.

The authentication data read at S170 will be used in a personal identification process executed by another routine. The personal identification process performs an authentication of an individual by comparing the authentication data with the data registered previously, and performs post-authentication process such as unlocking the door when the authentication is satisfied.

In contrast, when the button SW-ON flag is set to the value of one "1" at S160, another routine will perform a process of the transition into security-activated state using the security instruments. Note that the condition where the button SW-ON flag indicates the value of one "1" may allow the direct transition into the security-activated state. The present embodiment, however, allows the transition into the security-activated state when the authentication of the ID card 70 is satisfied within a predetermined period of time since the button SW-ON flag is set to the value of one "1." In contrast, the transition into the security-activated state is disallowed when the authentication of the ID card 70 fails to be satisfied within the predetermined period of time since the button SW-ON flag is set to the value of one "1."

A-5. Advantageous Effects

The first embodiment provides the card reader 10 as follows. The press-button switch unit 50 is attached to the cover 40 of the main body 20 of the card reader 10, while the auxiliary loop antenna 28 is provided inside of the main body 20. This configuration enables the RE tag 51 of the press-button switch unit 50 to communicate with the IC chip 22 of the main body 20 with high sensitivity, further eliminating the needs of changes in the internal wiring or changes in the housing structure, such as boring a hole in the housing for wiring. This facilitates the design changes such as changing the attachment position of the switch unit and adding a new switch unit.

Figure 6:
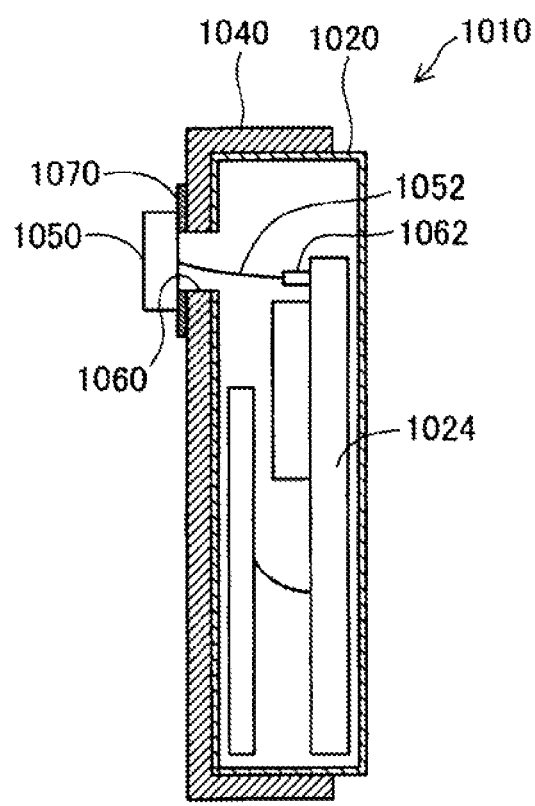
FIG. 6 is a partial cross-sectional side view of a card reader of a comparative example.

FIG. 6 is a partial cross-sectional side view of a card reader 1010 as a comparative example. The card reader 1010 of the comparative example includes a press-button switch unit 1050. This switch unit 1050 is only a press button connected to a circuit board 1024 via a cable 1052, instead of including an RE tag like in the first embodiment of the present disclosure. According to the comparative example, changing the attachment position of the press-button switch unit 1050 to a different position involves changes of positions, such as the position of a hole 1060 for the unit 1050, a position of a cable 1052, the position of a part 1062 connecting the cable 1052 to a circuit board 1024. The comparative example thus fails to facilitate the design changes for the attachment position of the press-button switch unit 1050. By contrast, the card reader 10 of the first embodiment eliminates need of connecting the press-button switch unit 50 to the IC chip 22 of the main body 20 with a cable, requiring none of the above changes of the positions in the comparative example and thus facilitating the design changes to change the attachment position of the press-button switch unit 150.

In addition, the auxiliary loop antenna 28 primarily communicates with the antenna coil 54 of the press-button switch unit 50 alone; this enables the antenna coil 54 and the auxiliary loop antennas 28 to be arranged to be close to each other. The card reader 10 of the present embodiment enables to reduce the size, such as an area or the number of turns, of the auxiliary loop antenna 28 and facilitate the re-arrangement of the auxiliary loop antenna 28 when needed in moving or adding the press-button switch unit 50. Furthermore, the auxiliary loop antenna 28 having a compact size allows easy design change when the card reader is prepared by changing the design of a conventional card reader that connects a press-button switch unit to a control circuit with wiring.

In addition, the card reader 10 of the present embodiment having the auxiliary loop antenna 28 enables a reliable communication with the press-button switch unit 50, which might be arranged outside of the reading area RA for IC cards of the communication range of the main loop antenna 26, enhancing the flexibility of the attachment position of the press-button switch unit 50.

In addition, when a press manipulation is not applied to the press-button switch unit 50, the antenna coil 54 of the switch unit 50 is maintained in the dissonance state at the operating frequency of the auxiliary loop antenna 28. The antenna coil 54 thus does not interfere with the reading by the auxiliary loop antenna 28. The auxiliary loop antenna 28 can be thus used for reading the ID card 70 when the antenna coil 54 is in the dissonance state, enlarging the reading area for the ID card 70 to improve users' manipulability for reading.

Further, the card reader 1010 of the comparative example need include a rubber packing 1070 between the press-button switch unit 1050 and a cover 1040 for preventing water entry from the hole 1060. By contrast, the card reader 10 of the present embodiment eliminates the need of boring holes in the cover 40 or the main body 20 in attaching the press-button switch unit 50, thus providing an advantageous effect in that the waterproof measure is easier. Further, the card reader 1010 of the comparative example fails to easily detach the cover 1040 since the press-button switch unit 1050 and the circuit board 1024 are connected with the cable 1052. By contrast, the card reader 10 of the present embodiment provides an advantageous effect in that the cover 40 is easily detached. Further, the card reader 10 of the present embodiment can change the attachment position of the press-button switch unit 50 by replacing a whole cover 40 where a press-button switch unit 50 is attached at a position by another whole cover 40 where another press-button switch unit 50 is attached at another position.

Furthermore, the card reader 10 of the present embodiment can perform easily the design change to additionally attach a new press-button switch unit, for instance, increasing the number of press-button switches from one to two or more.

In addition, the card reader 10 of the present embodiment arranges the auxiliary loop antenna 28 to face the front plate part 20a of the housing, The antenna coil of the press-button switch unit 50 may be arranged on either front face or back face of the front face of the housing for wireless communication; namely, the antenna coil 54 may be arranged outside of the housing, or embedded in a front face of the housing such as a cover. This eliminates the need to prepare the region for arranging the antenna coil inside of the housing, while having only the need to prepare the region for arranging the auxiliary loop antenna 28. That is, this eliminates the need of the primarily required region for the antenna coil 54 in installing a wireless switch unit, removing the relevant design restrictions to facilitate the design of the housing. Designing a housing is typically difficult since the housing contains internally a variety of components and has restrictions in designing the internal space. The present embodiment can respond to such difficulty, facilitating the design.

B. Second Embodiment

Figure 7A:
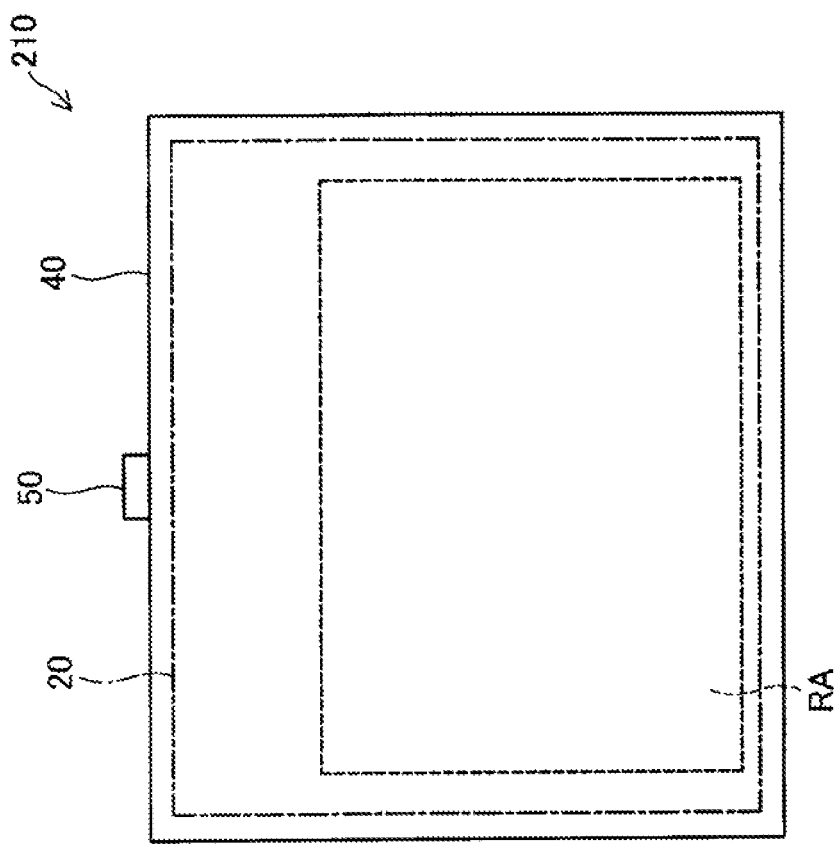
FIG. 7A is a front view of a card reader according to a second embodiment of the present disclosure.
Figure 7B:
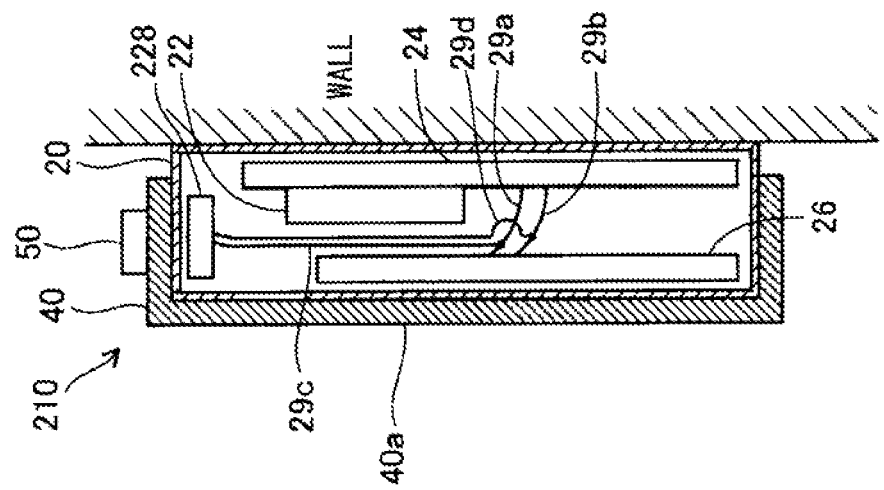
FIG. 7B is a partial cross-sectional side view of the card reader.

A card reader 210 according to a second embodiment of the present disclosure is illustrated in FIGS. 7A and 7B. FIG. 1A illustrates a front view; FIG. 1B illustrates a partial cross-sectional side view. The card reader 210 of the second embodiment is different from the card reader 10 of the first embodiment in the attachment position of the press-button switch unit and the arrangement position of the auxiliary loop antenna. Other components of the card reader 210 of the second embodiment, which are identical to those of the card reader 10 in the first embodiment, are assigned with the same reference numerals as those in FIGS. 1A and 1B without further explanation.

The auxiliary loop antenna 228 faces the side plate part 20b on the upper side of the main body 20, as illustrated. That is, the loop plane of the auxiliary loop antenna 228, which is parallel with a horizontal plane, faces the side plate part 20b on the upper side of the main body 20. The press-button switch unit 50 is attached to the position corresponding to the auxiliary loop antenna 228 on the side face 40b on the upper side of the cover 40. That is, the press-button switch unit 50 is provided in the communication range of the auxiliary loop antenna 228 on the side face 40b on the upper side of the cover 40. The configuration and the attachment method of the press-button switch unit 50 are the same as those of the first embodiment.

The card reader 210 of the second embodiment facilitates the design changes including the change of the attachment position of the press-button switch unit 50 and adding newly the press-button switch unit, like the card reader 10 of the first embodiment, further providing better waterproof measure like the first embodiment. Further, the card reader 210 of the second embodiment provides the press-button switch unit 50 to be arranged on the side face 40b of the cover 40, increasing the flexibility in the attachment position of the switch unit 50. In addition, the size in the vertical direction of the card reader 210 can be reduced as compared with that of the card reader 10 of the first embodiment, downsizing the size of the card reader 210.

In addition, the card reader 210 in the second embodiment, which arranges the auxiliary loop antenna 228 for the press-button switch unit 50 as facing the side plate part 20b on the upper side of the main body 20, can keep favorable the sensitivity in the communication with the press-button switch units 50. Furthermore, the auxiliary loop antenna 228 facing the side plate part 20b on the upper side of the main body 20 provides little influence on the reading of the ID card 70 by the main loop antenna 26, enhancing the communication sensitivity.

Note that the card reader 210 may also employ modifications of the card reader 10 of the first embodiment.

C. Third Embodiment

Figure 8:
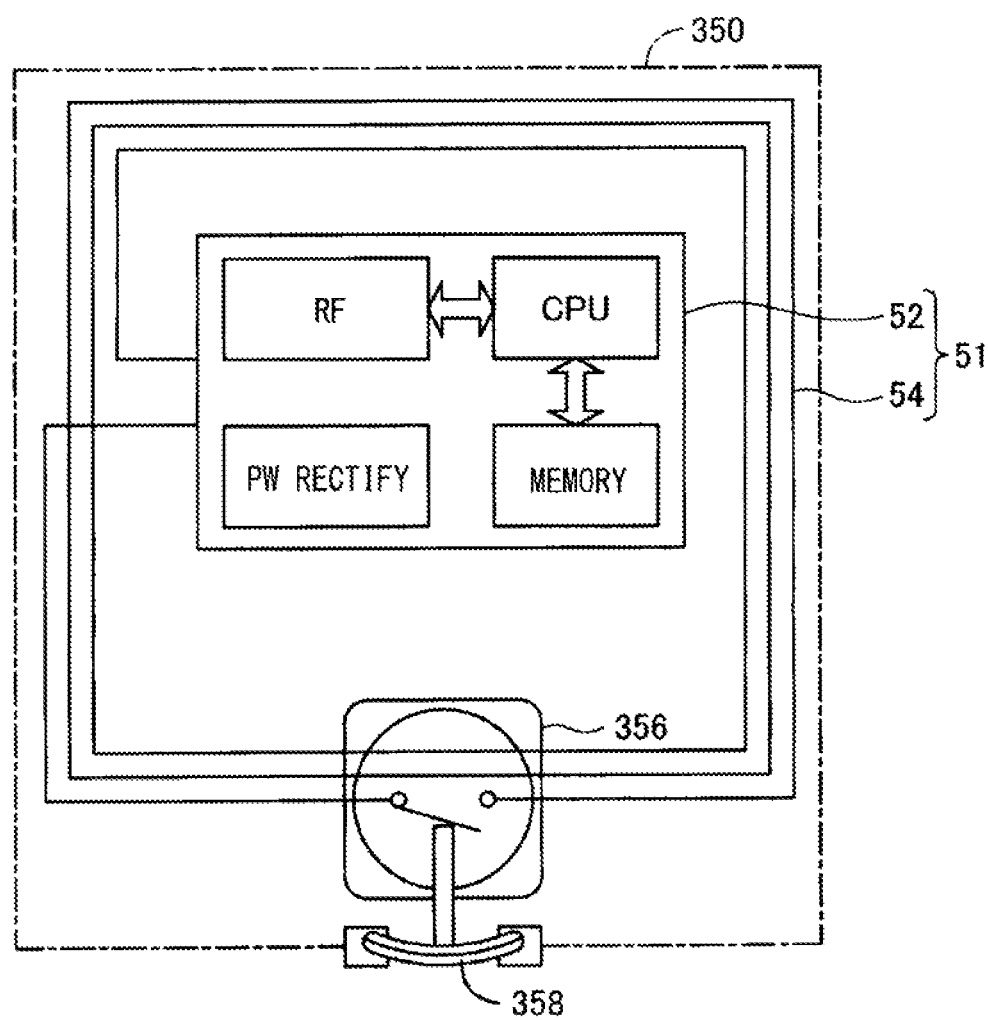
FIG. 8 is a diagram for explaining an internal configuration of a temperature switch unit in a card reader according to a third embodiment of the present disclosure.

FIG. 8 is a diagram for explaining an internal configuration of a temperature switch unit 350 included in a card reader according to a third embodiment of the present disclosure. The temperature switch unit 350 in the third embodiment has a configuration corresponding to that of the press-button switch unit 50 in the first embodiment; the card reader of the third embodiment includes a main body and a cover identical to those of the first embodiment, in addition to the temperature switch unit 350.

The temperature switch unit 350 is different from the press-button switch unit 50 of the first embodiment in that the manipulation portion 58 (see FIG. M) is replaced with a bimetal 358, as in FIG. 8. The bimetal 358, which is arranged to be exposed from the front face of the temperature switch unit 350, functions as a temperature detection part. The attachment position of the temperature switch unit 350 to the cover is the same as that of the press-button switch unit 50 in the first embodiment. In addition, the temperature switch unit 350 includes an IC chip 52 and an antenna coil 54 identical to those of the press-button switch unit 50 in the first embodiment, as indicated in FIG. 8. The switch body 356, which is incorporated in the middle of the antenna coil 54, turns on or off the antenna coil 54 in accordance with the shape change of the bimetal 358.

In the card reader of the third embodiment, the bimetal 358 deforms to be in a bent state when a temperature around the temperature switch unit 350 becomes a predetermined value or more, turning on the antenna coil 54, whereas the bimetal 358 returns from the bent state when the temperature becomes less than the predetermined value, turning off the antenna coil 54.

According to the card reader of the third embodiment, only attaching the temperature switch unit 350 to the cover of the main body permits the communication between the RF tag 51 of the temperature switch unit 350 and the main body of the card reader, allowing the temperature switch unit 350 to function as a switch to inform a fire report system of an occurrence of fire. The card reader of the third embodiment can facilitate design changes such as changing the attachment position of the temperature switch unit 350 and adding anew a press-button switch unit. The third embodiment, which substitutes the bimetal 358 for the manipulation portion 58 of the first embodiment, may alternatively substitute the bimetal 358 for the manipulation portion of the second embodiment.

E. Modifications

The present disclosure, which is not limited to the first to third embodiments or modification of those embodiments, may cover various aspects, e.g., the following modifications.

First Modification

The first to second embodiments, which provide a switch unit to include a manipulation portion manipulated by users, determines that a predetermined condition is satisfied when the manipulation portion is manipulated. In addition, the third embodiment, which provides a switch unit includes a temperature detection part, determines that a predetermined condition is satisfied when a detection result of the temperature detection part becomes a predetermined value or greater. The first modification may include the following examples. A first example, which provides a switch unit to include a clock, may determine that a predetermined condition is satisfied when the dock indicates a predetermined time zone. This first example can easily change the design to permit an access using an IC card only for the predetermined time zone. A second example, which provides a switch unit to include a tonometer that only touches a finger to measure, may permit an access using an IC card when the measured value is a predetermined value or less. This second example can easily change the design to permit an access using an IC card when a user has a low blood pressure. Thus the first modification, which provides a switch unit to include a measurement instrument such as a sensor, may determine that a predetermined condition is satisfied when the instrument outputs a predetermined output.

Second Modification

The first and the second embodiments, which include the auxiliary loop antenna 28, 228 for the press-button switch unit 50, further include the IC chip 22 functioning commonly as both a control circuit receiving reception signals of the auxiliary loop antenna 28, 228 and a control circuit receiving reception signals of the main loop antenna 26. In contrast, two different IC chips may be provided; a first circuit receives reception signal of the auxiliary loop antenna 28, 228 and a second circuit receives reception signal of the main loop antenna 26. That is, the control circuit, which communicates with the press-button switch unit 50 to receive data from a memory in the press-button switch unit 50, may be provided independent of the control circuit that communicates with the ID card 70 within the communication range of the main loop antenna 26 to receive data from a memory in the ID card 70.

Third Modification

The first to third embodiments provide the switch unit to contain integrally the IC chip, the antenna coil, the switch body, and the manipulation portion (or bimetal). Alternatively, an antenna coil may be separated from a main body portion that contains integrally an IC chip, a switch body, and a manipulation portion (or bimetal) the antenna coil may be connected to the manipulation portion (or bimetal) in the main body portion with a cable. This configuration only need arrange the antenna coil of the switch unit to match the position of the auxiliary loop antenna in the main body of the card reader, maintaining favorable the communication sensitivity and increasing the flexibility in the attachment position of the main body portion of the press-button switch unit.

Fourth Modification

The first to third embodiments provide the press-button switch unit 50, which designates or activate "security," may alternatively inactivate or unlock a security-activated state. The press-button switch unit, which is not limited to "security," may serve as switches for other uses or instructions, such as: instruction for turning on and off devices, such as room lighting; instruction for charging or discharging an electronic money recorded in an IC card; and instruction for returning service points accumulated or recorded in an IC card.

Fifth Modification

The first to third embodiments, which provide a single press-button switch unit, may alternatively provide a plurality of press-button switch units. Each of those press-button switch units may include an IC chip, an antenna coil, and a switch main body. Alternatively, only one antenna coil and a plurality of combinations, each combination having a single IC chip and a single switch main body, may be provided such that the combinations are electrically connected in parallel to the single antenna coil. Each IC chip stores individually a unique identification data, thus permitting a determination as to which switch main body is manipulated even though the single antenna coil is commonly used for the combinations. In addition, when a plurality of press-button switch units are provided in a card reader, the order of manipulating individually these switch units may be determined so as to permit unlocking only when the determined order of manipulating accords with a predetermined order.

Sixth Modification

Each manipulation portion, which has a convex shape in the first to third embodiments, may have another shape such as a concave shape having a recess or a flat shape having no protrusion from periphery, or another type such as a touch-sensitive panel. In addition, the manipulation portion may be a toggle switch. The manipulation portion may thus employ any one from a variety of types of switches.

Seventh Modification

Each switch unit such as a press-button switch unit or bimetal switch unit, which is fixed to the housing, i.e., either the cover or the main body using double-stick tapes in the above embodiments, may be alternatively put in a pocket portion that is formed in the housing, facilitating detachment of the switch unit and design changes, facilitating the design change significantly.

In addition, the press-button switch unit or the bimetal switch unit may be embedded in the cover.

Eighth Modification

The IC card, which serves as an ID card for identifying an individual in each of the above embodiments, may alternatively serve as another type of card, such as a credit card, an automated teller machine (ATM) card, a transportation card, a certification card. In addition, the card reader, which is used for the access control system managing accesses of offices, may be also used for a variety of applications or uses.

Ninth Modification

The contactless IC card may be any one of at least first to fourth types according to different communication ranges or distances from shorter to longer: the first corresponding to a close-coupling contactless IC card operable in contact with or close to a card reader; the second corresponding to a proximity contactless IC card operable within proximity of a card reader; the third corresponding to a vicinity contactless IC card operable within vicinity of a card reader; and the fourth corresponding to a remote contactless IC card operable remotely from a card reader. Further, the contactless IC card may be any other card operable using wireless communication.

Tenth Modification

Although the switch unit includes the RF tag that is of a passive type needing none of internal battery, in each of the above embodiments, the switch unit may include alternatively an RF tag that is of an active or semi-active type that needs an internal battery.

Eleventh Modification

The ID card 70, may not be limited to have a card shape, may be replaced by a non-card-shaped handheld device or terminal that contains internally the IC chip 72 and antenna coil 74 to communicate with the auxiliary loop antenna 28 of the card reader 10. For instance, the IC chip 72 and antenna coil 74 may be incorporated into a smartphone so as to achieve all the functions of the ID card 70.

An aspect of the present disclosure described herein is set forth in the following clauses.

(1) An aspect of the present disclosure provides a card reader that reads information in an integrated circuit (IC) card as follows. The card reader includes a housing, a first antenna, a control circuit, a switch unit, and a third antenna. The first antenna is disposed inside of the housing. The control circuit is to communicate with the IC card within a communication range of the first antenna and perform at least a process that acquires data from a memory in the IC card. The switch unit is provided to the housing and includes a radio frequency (RF) tag that includes a second antenna. The third antenna is disposed inside of the housing. The switch unit functions as a switch that performs a predetermined function by causing the RF tag to communicate with the control circuit via the second antenna and the third antenna when a predetermined condition is satisfied.

(2) In the card reader of the present aspect, the third antenna may be provided to have a communication range that includes at least a part of a first face of the housing; and of the switch unit, the second antenna at least may be arranged within the communication range of the third antenna including the first face. This configuration allows the second antenna to be arranged adjacent to the third antenna to improve the communication sensitivity.

(3) In the card reader of the present aspect, the first antenna may have a communication range that includes at least a part of a first face of the housing; and the third antenna may have a communication range that includes at least a part of a second face of the housing intersecting the first face; and of the switch unit, the second antenna at least may be arranged within the communication range of the third antenna including the second face. This configuration allows the second antenna to be arranged adjacent to the third antenna to improve the communication sensitivity. In addition, the third antenna is arranged to the second face intersecting the first face; the second face is outside of the communication range of the first antenna unlike the first face, increasing the flexibility in the attachment position of the switch unit including the second antenna. Furthermore, this prevents the first antenna from degrading the reading performance for the IC card and improves the communication sensitivity.

(4) In the card reader of the present aspect, the switch unit may include a manipulation portion to be manipulated by a user; and the switch unit may determine that the predetermined condition is satisfied when the manipulation portion is manipulated. This configuration can facilitate the design changes against the manipulation portion manipulated by users. The manipulation portion to be manipulated by users typically need respond to a variety of requests relative to desirable interfaces depending on purposes or installation positions of card readers. Facilitating the design changes can provide advantageous effects significantly.

(5) In the card reader of the present aspect, the switch unit may activate the RF tag with the electric power generated by the second antenna receiving signals sent from the first antenna. This configuration may employ a passive RF tag, eliminating the need of installing a power source inside of the switch unit and downsizing the switch unit.

(6) In the card reader of the present aspect, the second antenna of the switch unit may be maintained in a dissonance state at an operating frequency of the first antenna, when the predetermined condition is not satisfied; whereas the second antenna may be moved to a resonance state at the operating frequency of the first antenna, when the predetermined condition is satisfied. This configuration maintains the second antenna in a dissonance state in the operating frequency of the third antenna when the predetermined condition is not satisfied, not interfering with the third antenna reading IC cards. The third antenna can be thus used for reading IC cards when the second antenna is in the dissonance state, enlarging the reading area for IC cards to improve users' manipulability for reading IC cards.

(7) In the card reader of the present aspect, the housing may be provided with a cover, to which the switch unit is attached. This configuration can perform a design change of a position of the switch unit by replacing the whole of the cover if needed, facilitating the design change significantly.

Furthermore, a variety of systems, such as an access control system and a security system may be achieved by including the card reader of the present aspect.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A card reader to read information in an integrated circuit (IC) card, the card reader comprising:
a housing;

a first antenna enclosed inside of the housing;
a control circuit communicating with the IC card within a communication range of the first antenna, the control circuit performing at least a process that acquires data from a memory in the IC card;
a switch unit including a radio frequency (RF) tag that includes a second antenna; and
a third antenna enclosed inside of the housing,
wherein:
the switch unit is externally fixed to the housing inside of which the first antenna and the third antenna are enclosed;
the switch unit is configured to perform a predetermined function by causing the RF tag to communicate with the control circuit via the second antenna and the third antenna when a predetermined condition is satisfied;
the third antenna has a different communication range that includes at least a part of a first face of the housing; and
of the switch unit, the second antenna at least is arranged within the different communication range of the third antenna including the first face.

2. A card reader to read information in an integrated circuit (IC) card, the card reader comprising:
a housing;
a first antenna enclosed inside of the housing;
a control circuit communicating with the IC card within a communication range of the first antenna, the control circuit performing at least a process that acquires data from a memory in the IC card;
a switch unit including a radio frequency (RF) tag that includes a second antenna; and
a third antenna enclosed inside of the housing,
wherein:
the switch unit is externally fixed to the housing inside of which the first antenna and the third antenna are enclosed;
the switch unit is configured to perform a predetermined function by causing the RF tag to communicate with the control circuit via the second antenna and the third antenna when a predetermined condition is satisfied;
the communication range of the first antenna includes at least a part of a first face of the housing;
the third antenna has a different communication range that includes at least a part of a second face of the housing intersecting the first face; and
of the switch unit, the second antenna at least is arranged within the different communication range of the third antenna including the second face.

3. A card reader to read information in an integrated circuit (IC) card, the card reader comprising:
a housing;
a first antenna enclosed inside of the housing;
a control circuit communicating with the IC card within a communication range of the first antenna, the control circuit performing at least a process that acquires data from a memory in the IC card;
a switch unit including a radio frequency (RF) tag that includes a second antenna; and
a third antenna enclosed inside of the housing,
wherein:
the switch unit is externally fixed to the housing inside of which the first antenna and the third antenna are enclosed;
the switch unit is configured to perform a predetermined function by causing the RF tag to communicate with the control circuit via the second antenna and the third antenna when a predetermined condition is satisfied;
the second antenna is maintained in a dissonance state at an operating frequency of the third antenna, when the predetermined condition is not satisfied; and
the second antenna is moved to a resonance state at the operating frequency of the third antenna, when the predetermined condition is satisfied.

\* \* \* \* \*